(12) United States Patent
Sardat

(10) Patent No.: US 9,887,636 B2
(45) Date of Patent: Feb. 6, 2018

(54) METHOD OF REDUCING COMMON MODE CURRENT

(75) Inventor: Pierre Sardat, Le Raincy (FR)

(73) Assignee: Valeo Systemes de Controle Moteur, Cergy Pontoise (FR)

( * ) Notice: Subject to any disclaimer, the term of this patent is extended or adjusted under 35 U.S.C. 154(b) by 945 days.

(21) Appl. No.: 13/618,251

(22) Filed: Sep. 14, 2012

(65) Prior Publication Data

US 2013/0070501 A1  Mar. 21, 2013

(30) Foreign Application Priority Data

Sep. 16, 2011  (FR) .................................... 11 58279

(51) Int. Cl.
| | | |
|---|---|---|
| H02M 7/06 | (2006.01) | |
| H02M 5/06 | (2006.01) | |
| H02M 1/12 | (2006.01) | |
| H02M 1/44 | (2007.01) | |

(52) U.S. Cl.
CPC ............... *H02M 5/06* (2013.01); *H02M 1/12* (2013.01); *H02M 1/44* (2013.01); *H02M 7/06* (2013.01); *H02M 2001/123* (2013.01)

(58) Field of Classification Search
CPC .. H02M 2001/123; H02M 7/02; H02M 7/155; H02M 7/06
USPC ............................ 327/552; 363/126; 323/220
See application file for complete search history.

(56) References Cited

U.S. PATENT DOCUMENTS

| | | | |
|---|---|---|---|
| 6,636,107 B2 * | 10/2003 | Pelly .............................. | 327/552 |
| 6,690,230 B2 | 2/2004 | Pelly | |
| 6,819,076 B2 | 11/2004 | Takahashi | |
| 6,999,330 B2 * | 2/2006 | Mutoh ..................... | H02M 1/44 |
| | | | 363/144 |
| 7,385,438 B2 * | 6/2008 | Pelly ............................. | 327/551 |
| 2004/0004514 A1 | 1/2004 | Pelly | |

(Continued)

FOREIGN PATENT DOCUMENTS

| | | |
|---|---|---|
| EP | 0 986 165 A2 | 3/2000 |
| JP | 2010259247 | * 11/2010 |
| WO | 2010/057892 A1 | 5/2010 |

OTHER PUBLICATIONS

Ogasawara, S.; Ayano, H. ; Akagi, H. An active circuit for cancellation of common-mode voltage generated by a PWM inverter Sep. 1998 Power Electronics, IEEE Transactions on (vol. 13 , Issue: 5) pp. 835-841.*

(Continued)

*Primary Examiner* — Emily P Pham
*Assistant Examiner* — Shahzeb K Ahmad
(74) *Attorney, Agent, or Firm* — Osha Liang LLP

(57) ABSTRACT

A method of reducing common mode current that flows between an internal ground of an electrical circuit and an Earth ground, the electrical circuit is supplied by an electrical network delivering an alternating voltage. The method includes applying a voltage by the electrical network between the internal ground of the circuit and the Earth ground and applying an additional voltage between the internal ground of the circuit and the Earth ground using an electronic component interposed between the internal ground of the circuit and Earth ground, this additional voltage opposing the voltage applied by the electrical network between the internal ground and the Earth ground so as to reduce the common mode current at the frequency of the electrical network.

17 Claims, 3 Drawing Sheets

(56) References Cited

U.S. PATENT DOCUMENTS

2007/0058406 A1\* 3/2007 Inoshita et al. ............... 363/132
2010/0080028 A1\* 4/2010 Cheng et al. ................ 363/126

OTHER PUBLICATIONS

International Search Report issued in FR 1158279, dated May 3, 2012 (2 pages).
Acharya et al., "Common Mode DC Bus Filter for Active Front-End Converter," Department of Electrical Engineering, Indian Institute of Science, Bengaluru, India, Dec. 20, 2010 (6 pages)

\* cited by examiner

METHOD OF REDUCING COMMON MODE CURRENT

CROSS-REFERENCE TO RELATED APPLICATIONS

This is a Paris Convention application based on French Application No. 1,158,279, filed Sep. 16, 2011. This application claims the priority from the same, and hereby incorporates the same by reference in its entirety.

BACKGROUND

The object of the present invention is the reduction of common mode current flowing between the internal ground of an electrical circuit and the Earth ground, said circuit being supplied by an electrical network. The electrical network is notably, but not exclusively, an electrical network in which the neutral is connected directly to the Earth ground.

The electrical network delivers a multiphase, or non-multiphase, alternating voltage and this voltage is rectified for supplying an energy storage unit of the electrical circuit such as a battery.

The problem that the invention aims to resolve will be explained by referring to the following non-restrictive example. The electrical circuit is, for example, on board a vehicle and may include a system of electrical propulsion of the vehicle. The vehicle further includes a frame.

When the storage unit is recharged by the electrical network, the frame is connected to the Earth ground. Due to the presence of parasitic components or not between the electrical circuit and the frame, a common mode current may flow from the circuit to the frame and loop back via the Earth ground in the electrical network.

Such a common mode current is dangerous for a user resting their feet on the ground and leaning on the frame of the vehicle.

Accordingly, there are standards for limiting the value of common mode current permissible between the part of the electrical circuit downstream from the rectifier and the frame. European standards thus limit the maximum common mode current to 3.5 mA at a frequency of 50 Hz.

To meet these standards, it is known that an isolating transformer is provided between the part of the circuit downstream from the rectifier and the frame. Such a transformer can be expensive and its integration into an already restricted space can be difficult.

It is further known that a controllable switch component is used for rectifying the current, such as a so-called PFC component (Power Factor Corrector) and specific strategies are implemented for controlling the switches. Such strategies may lead to the switches overheating and be very complex.

In the high frequency domain, through the publication "A simplified active input EMI filter of common-mode voltage cancellation for induction motor drive" an active filter is known to reduce the common mode current at high frequencies by injecting a voltage in series into the electrical network.

Also known from US patent application 2004/0004514 is an active filter seeking to reduce the common mode current at high frequencies in the field of electromagnetic compatibility (EMC).

BRIEF SUMMARY OF THE INVENTION

The invention aims to overcome the drawbacks of the above solutions for reducing the common mode current between the electrical circuit and the Earth ground.

The invention achieves this, according to one of its aspects, using a method of reducing the common mode current flowing between the internal ground of an electrical circuit and the Earth ground, said circuit being supplied by an electrical network delivering an alternating voltage, method in which:

a voltage is applied by the electrical network between the internal ground of the circuit and the Earth ground and, an additional voltage is applied between the internal ground of the circuit and the Earth ground using an electronic component interposed between the internal ground of the circuit and Earth ground, this additional voltage opposing the voltage applied by the electrical network between the internal ground and the Earth ground, so as to reduce the common mode current.

The additional voltage applied in the method above is opposed to the voltage applied by the electrical network between the internal ground of the circuit and the Earth ground, the resultant voltage between the neutral of the electrical network and the Earth ground, measured at the impedance terminals of the Earth ground is thus reduced, from which it follows that the common mode current is reduced.

The additional voltage may be applied in parallel with the parasitic capacitance existing between the internal ground of the circuit and the Earth ground.

The additional voltage may have a sign opposite to that of the voltage applied by the network between the internal ground of the circuit and the Earth ground. The additional voltage may be in absolute value less than or equal to the value of said voltage applied by the electrical network. The additional voltage is equal, for example, in absolute value to at least 50%, better 60%, better 70%, better 80%, better 90%, better 95% of the voltage applied by the network between the internal ground of the circuit and the Earth ground.

The closer the value of the additional voltage is to the value of the applied voltage, the more the value of the common mode current may be reduced. The additional voltage may thus be as close as possible to the voltage applied by the network between the internal ground of the circuit and the Earth ground.

The additional voltage may be generated at the output of the electronic component, the latter receiving as input the common mode current flowing between the internal ground of the circuit and the Earth ground when the circuit is supplied by the electrical network.

The electronic component may be without a field effect transistor. The electronic component includes, for example, bipolar transistors, notably dimensioned to withstand a Vce voltage of the order of 450 V.

The electronic component may not implement transitions from a conductive state to a blocked state.

The 0 dB bandwidth of the electronic component may extend between 5 Hz and 1.1 kHz.

The electronic component may act as a gyrator.

The invention may then implement a slaving of this common mode current to a predefined value for this current. This value may be zero or take a value less than the maximum value allowed by the standards. The electronic component may also be called an "active filter" as it is used to filter the common mode current at the network frequency, the latter generally being 50 Hz or 60 Hz.

The electronic component may be configured to filter only the common mode current at the network frequency.

As a variant, the electronic component may be configured to filter only the common mode current at the network frequency and the first ten harmonics of this common mode current. In the case where the electrical network provides a current at 50 Hz, the electronic component may thus filter the common mode current for frequencies between 50 Hz and 500 Hz.

The common mode current used as the input of the component may be obtained from the currents delivered by the electrical network to the electrical circuit. When the electrical circuit delivers a three-phase current, for example, the current flowing in each phase can be measured and each of these currents added vectorially to obtain the common mode current.

The invention may thus be used to dynamically determine the value of voltage to be applied for reducing the common mode current.

The above current measurement may be performed using a nanocrystalline magnetic core.

When the invention is implemented for recharging a storage unit of a hybrid or electric vehicle through the windings of the electric motor, as described, for example, in patent application WO 2010/057892 on behalf of the Applicant, the current measurement may take place at the motor windings. As a variant, the current measurement may take place between the connector for connecting the circuit to the electrical network and the electrical windings of the motor stator.

The additional voltage may be applied between the internal ground of the circuit and the Earth ground by applying a first voltage between the internal ground of the circuit and the internal ground of the electronic component and by applying a second voltage of opposite sign to that of the first voltage between the Earth ground and the internal ground of the electronic component, so that the difference between the first and the second voltage is equal to the additional voltage. Thus two amplifier stages can be used to produce the additional voltage. In this way, each amplifier stage can be produced using less expensive components than the components necessary for the production of one amplifier stage generating the additional voltage on its own.

The internal ground of the circuit and the internal ground of the electronic component may not be connected together. Notably they are not at the same potential.

The invention does not, however, exclude the possibility of using only a single amplifier stage for generating the additional voltage.

The electrical network may deliver an alternating voltage whose frequency is 50 Hz or 60 Hz. The electrical network delivers a single-phase or multiphase voltage, e.g. three-phase.

The electrical circuit may include a rectification stage for the alternating voltage delivered by the electrical network, this stage having a positive output terminal and a negative output terminal and the internal ground of the circuit may be connected to the negative or positive output terminal.

The rectification stage may or may not be configured for adapting the value of the rectified voltage to the components downstream from this stage. The rectification stage is, for example, a PFC component, notably a PFC component without a bridge (Bridgeless PFC).

According to one example of implementation of the invention, an energy storage unit may be connected between the positive and negative output terminals of the stage. The method may then be implemented when this energy storage unit is recharged by the electrical network.

The energy storage unit is formed, for example, of one or more batteries. In the latter case, the batteries may be fitted in series and/or in parallel.

The voltage at the terminals of the energy storage unit, when it is charged, may be between 150 V and 450 V. The electrical power absorbed by the energy storage unit may be greater than or equal to 100 W, e.g. of the order of a few kW when the electrical network is single-phase, or 20 kW or more with a three-phase network.

The electrical circuit and the frame may form part of an electrically driven or hybrid vehicle and the electrical circuit may include inductances formed by the stator windings of an electric motor.

The invention may be implemented according to a particular application in a vehicle having a frame and an electrical circuit supplied by an electrical network delivering an alternating current, the circuit including a rectification stage for the voltage delivered by the network downstream from which the internal ground of the circuit is connected and downstream from which an energy storage unit such as a battery is connected and a voltage that is generated between the internal ground and the frame is then applied to reduce the common mode current flowing between the internal ground of the circuit and the frame.

Advantageously, it is not necessary to provide galvanic isolation between the internal ground of the electrical circuit and the network to which the circuit is connected.

Thanks to the electronic component, the circuit may be without galvanic isolation with the Earth ground, with a parasitic capacitance between 0 and 350 nF, notably between 70 nF and 350 nF.

In the method according to the invention, the additional voltage is not injected in series with the components arranged between the circuit and the frame and responsible for the flow of common mode current but this voltage is injected in parallel with these components.

According to another of its aspects, the invention has the further object of an assembly comprising:
  an electrical circuit, comprising a rectification stage for an alternating voltage, said stage having a positive output terminal and a negative output terminal and the circuit having an internal ground connected to the negative or positive output terminal,
  a frame, and
  an electronic component connected first to the internal ground of the circuit and secondly to the frame, the component being configured for applying a voltage between the internal ground of the circuit and the frame, for reducing the current flowing between the internal ground and the frame when the electrical circuit is supplied by an electrical network.

The assembly may form part of a vehicle, in which case the frame is the frame of the vehicle.

The frame may, however, be different from a vehicle frame.

As a variant, the assembly may be integrated with other devices, e.g. a power supply system of a synchronous or asynchronous electric motor.

The assembly may be integrated into any system whose galvanic isolation is expensive, e.g. battery chargers absorbing an electrical power greater than or equal to 100 W.

The characteristics described above in relation to the method may also be combined, either individually or not, with the assembly above.

BRIEF DESCRIPTION OF THE DRAWINGS

The invention may be better understood on reading the following non-restrictive example of its implementation and on examining the accompanying drawings in which.

DETAILED DESCRIPTION

Figure 1:
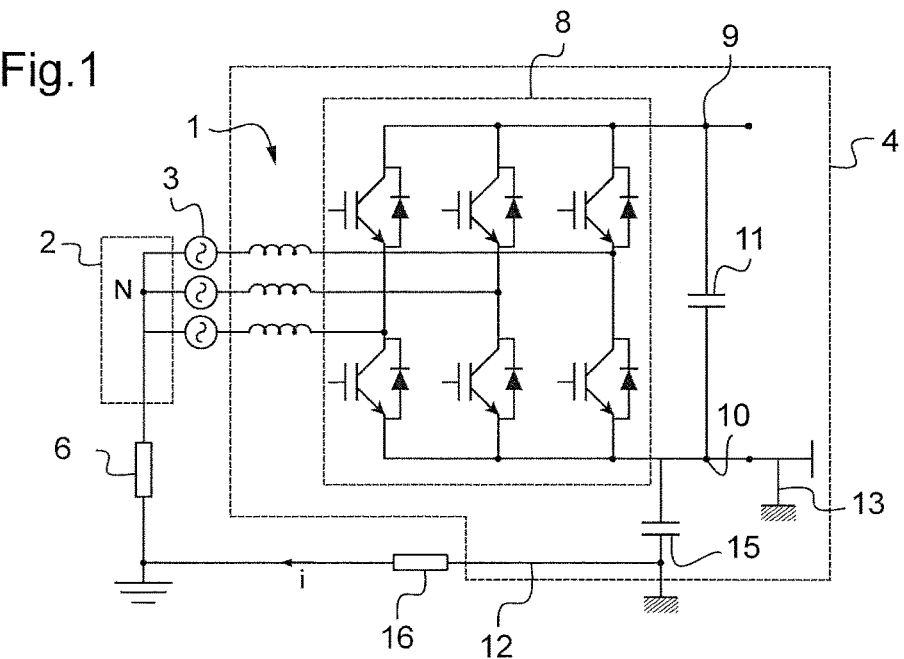
FIG. 1 schematically shows an assembly within which the invention may be implemented, FIG. 2 schematically shows a model in common mode equivalent to the assembly in FIG. 1.

FIG. 1 shows an assembly 1 within which the invention may be implemented.

This assembly 1 is supplied by an electrical network 2 via a connector 3. The electrical network 2 delivers an alternating voltage to an electrical circuit 4 of the assembly 1. In the example considered, the network 2 is three-phase and delivers a voltage with an effective value equal to 230 V. The frequency of the voltage is 50 Hz in the example considered. The neutral N of the electrical network 2 is connected to the Earth ground and a parasitic impedance 6 is interposed between the neutral N and the Earth ground.

The electrical circuit 4 includes inductances, a rectification stage 8 for the alternating voltage delivered by the network 2 and whose output terminals 9 and 10 are traversed by a direct current.

The rectification stage 8 includes, for example, controllable switches such as transistors. Stage 8 is, for example, a PFC component, known to a person skilled in the art for rectifying an alternating voltage, adapting the value of the rectified voltage to the load of the circuit 4 and complying with the standards in force regarding the value of the power factor and the emission of harmonic currents.

A capacitor 11 is fitted between the output terminals 9 and 10 of stage 8. An energy storage unit, e.g. a battery, not shown, may be connected in parallel with this capacitor 11. This battery absorbs an electrical power, e.g. greater than 100 W, e.g. of the order of 3 kW when the electrical network 2 is single-phase, e.g. of the order of 20 kW when the electrical network 2 is three-phase. The assembly 1 further includes a metal frame 12. In the event of a frame Earth ground fault, the frame is potentially connected to the Earth ground via an impedance 16. This impedance 16 corresponds, in the case where the frame forms part of a vehicle, to the body resistance of a user of the vehicle when the latter touches the bodywork on the one hand and the ground on the other.

When the assembly 1 forms, for example, a part of an electric or hybrid vehicle. The inductances 7 then correspond, for example, to the phase windings of the stator of an electric motor for driving an electric motor. The windings 7 can then be connected to the electrical network 2 according to the teaching of patent application WO 2010/057892.

A capacitance 15 models the parasitic impedances and/or actual impedances added for technical reasons, in the form of capacitor-type electronic components, notably between the terminal 10 of the circuit 4 and the frame 12. The terminal 10 of the circuit 4 is here the negative output terminal of the rectification stage 8 and the electrical circuit 4 has an internal ground 13 which is here connected to the terminal 10. Because of the existence of this capacitor 15, a common mode current can flow from the circuit 4 to the frame 12 and flowing through the Earth ground, loop back into the network 2.

In the case where the electrical network 2 delivers a multiphase alternating voltage and during a sequence of operation of the switches of the control stage 8, the terminal 10 is alternately connected to the neutral of the network 2 and to one of the phases of the network 2. In the case of a single-phase network 2, the terminal 10 is selectively connected to the neutral or to the phase of the network 2.

A voltage E is thus applied between the terminal 10 and the frame 12 connected to the Earth ground and, due to this voltage and the capacitor 15, current flows from the terminal 10 to the Earth ground.

The part of the circuit 4 upstream from the terminal 10 and the network 2 can thus be likened to a voltage source 20 alternately applying between the terminal 10 and the frame 12:

a zero voltage E, and a voltage E just like that delivered by the network 2 to the circuit 4.

Figure 2:
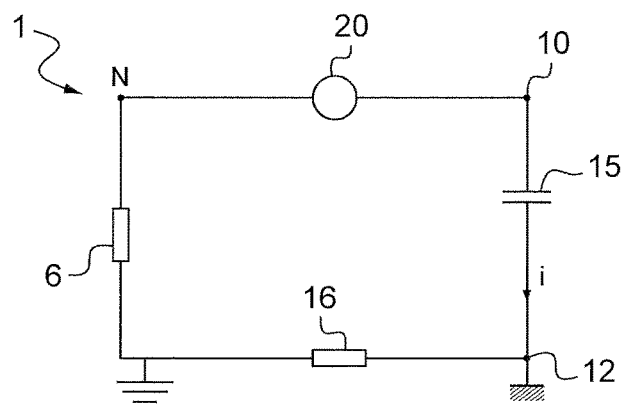

Accordingly, a current i flows through the capacitor 15 and the impedances 16 and 6 before looping back into the network 2. Thus the equivalent common mode model shown in FIG. 2 is obtained.

An example of implementation of the invention will be described with reference to FIG. 3.

Figure 3:
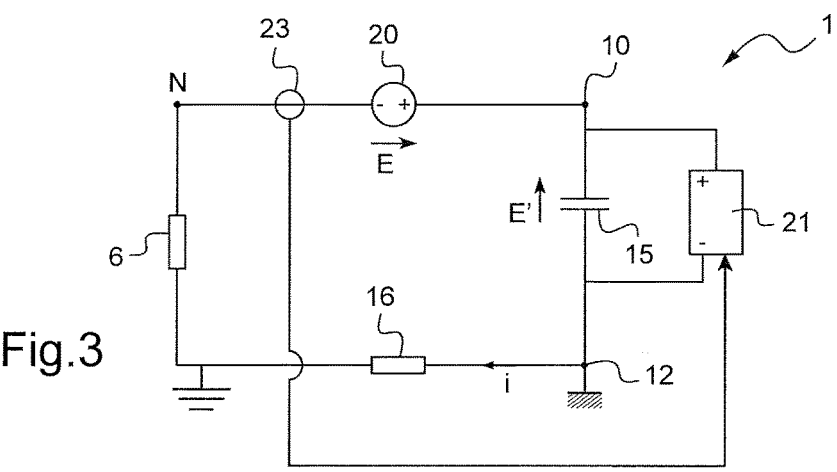
FIG. 3 shows the diagram of FIG. 2 in which an example of component according to the invention is introduced.

As can be seen in FIG. 3, an electronic component 21 is fitted in parallel with the capacitor 15 for reducing the value of the common mode current, or even cancelling this current. The electronic component 21 has a terminal connected to the output terminal 10 of the rectification stage 8 and a terminal connected to the frame 12.

This component 21 is an active filter configured for generating a frequency equal to that of the electrical network 2, this frequency in the example considered being 50 Hz, an additional voltage F opposing the voltage applied by the voltage source 20. The resultant voltage applied to the impedances 6 and 16 is thus reduced, even cancelled, so the current passing through these impedances 6 and 16 is reduced, even cancelled.

The additional voltage E' is applied by the electronic component 21 in parallel with the capacitor 15.

In the example considered, the component 21 is associated with a system of measurement 23 of the common mode current i passing through the circuit 4. In the case of a three-phase network, this system of measurement 23 can measure the current in each of the phases, using, for example, a nanocrystalline or other magnetic core and by calculation from these currents, determine the common mode current. Based on this information, the electronic component 21 generates at the terminals of the capacitor 15, in parallel with the latter, a voltage opposing the voltage applied by the source 20 between the terminal 10 and the frame.

An example of component 21 will now be described functionally and structurally with reference to FIGS. 4 and 5.

In the example described, the component 21 includes two amplifier stages 23 and 24. Each of these amplifier stages generates a voltage from the current value determined by the system 23. The two stages 23 and 24 may or may not be identical and may or may not generate the same voltage. The first and second voltage both have, for example, an amplitude of approximately 300 V.

In the example described, the first stage 23 is connected via the intermediary of a decoupling capacitance 28 to the output terminal 10 of the rectification stage 8 and the second stage 24 is connected via the intermediary of another decoupling capacitance 29 to the frame 12.

The second stage 24 includes a unit negative gain 30.

Figure 4:
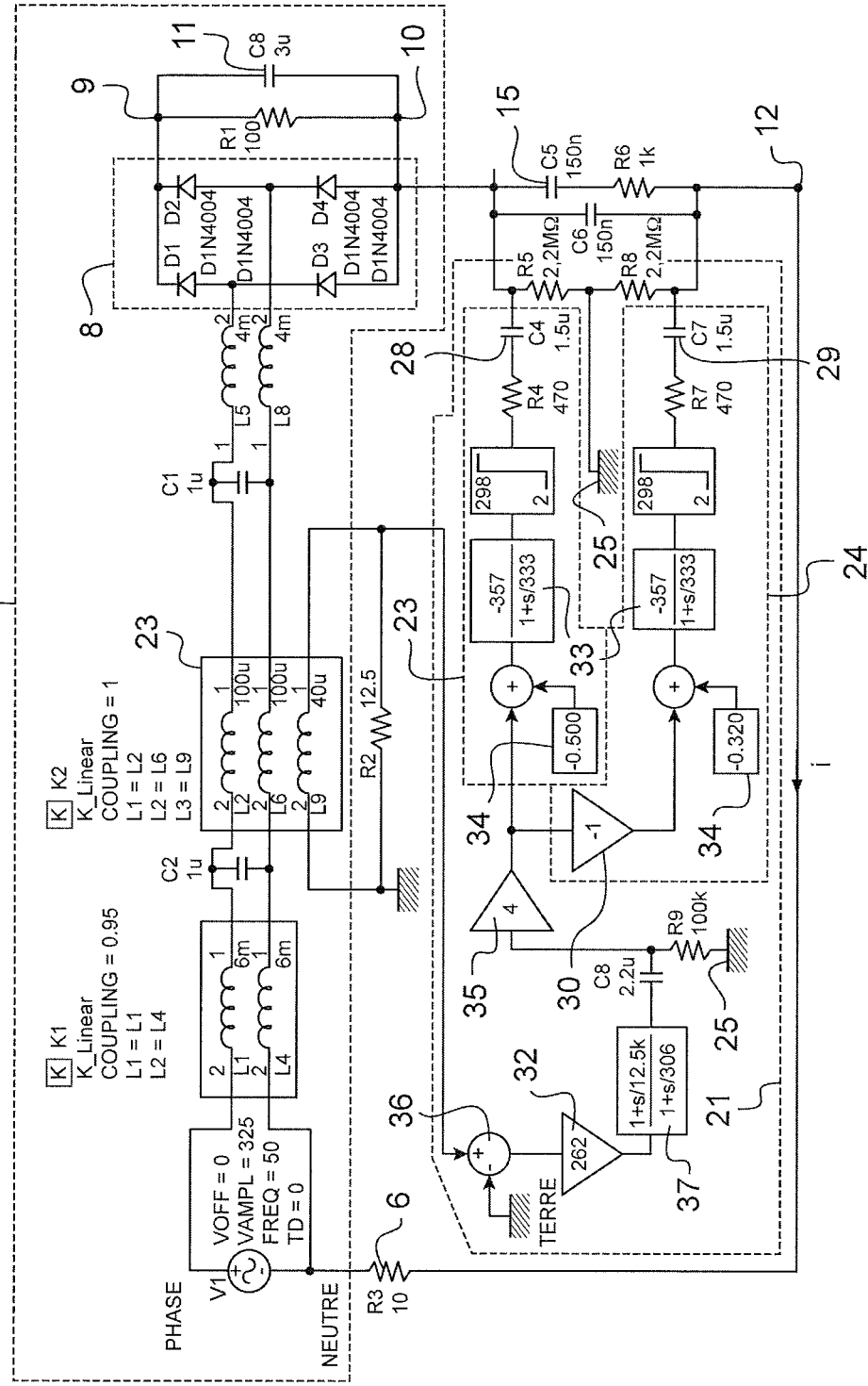
FIG. 4 shows the assembly from FIG. 1 in which an example of a solution according to the invention is implemented, the component used for this implementation being shown functionally.

With the two stages 23 and 24 shown in FIG. 4, a first voltage is applied between the output terminal 10 and the internal ground 25 of the electronic component 21 by the first stage 23 whilst a second voltage of opposite sign is applied between the frame 12 and the internal ground 25 of the electronic component 21. The difference between these two voltages corresponds to the voltage applied by the electronic component 21 to the capacitor 15 for reducing the common mode current.

Each amplifier stage 23 or 24 includes a high gain, low-pass filter 33 and a DC voltage component generator 34.

The component 21 further includes, upstream from stages 23 and 24, gains 32 and 35, a zero comparator 36 and a unit 37 forming a PID-type controller.

Figure 5:
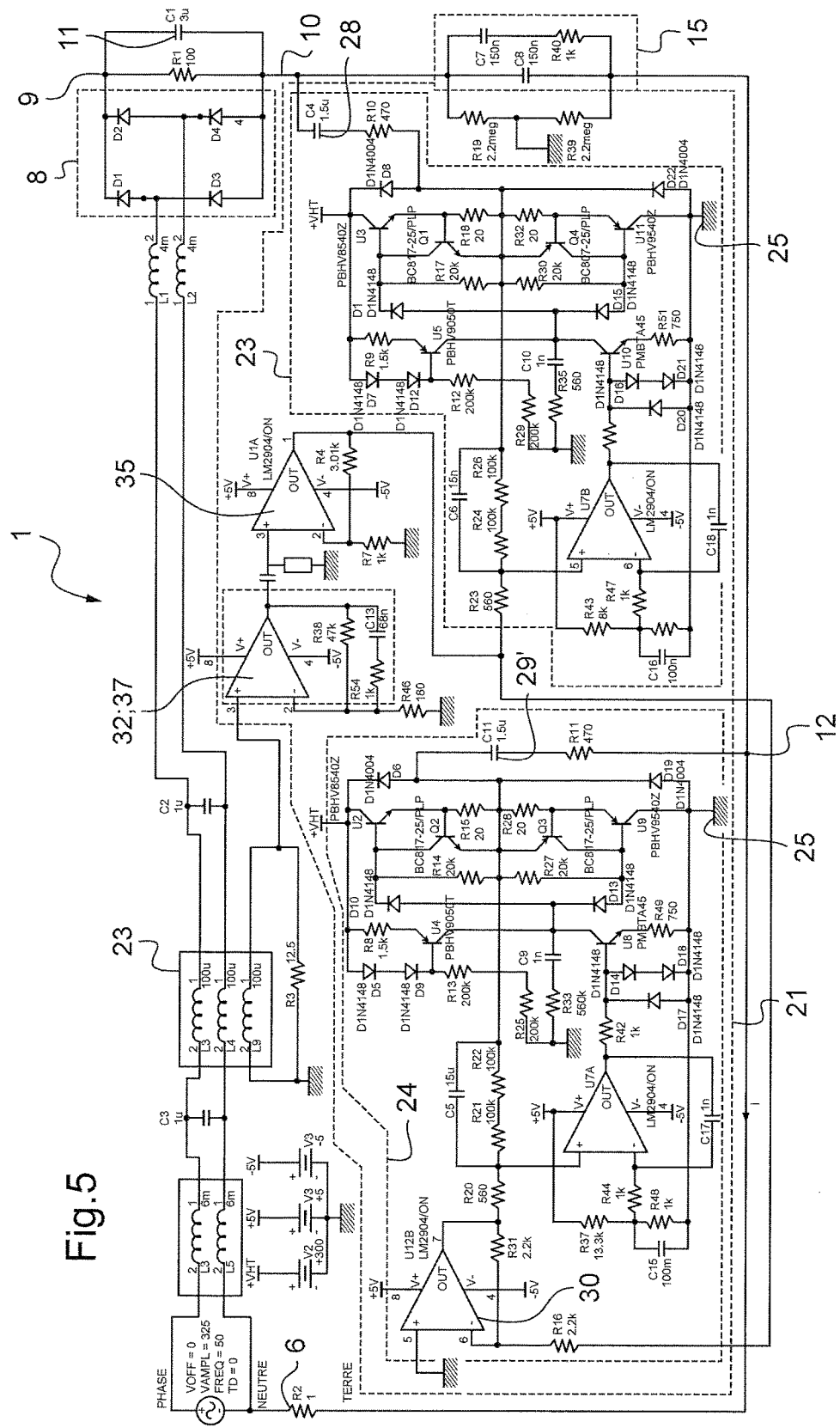
FIG. 5 shows the assembly from FIG. 1 in which an example of a solution according to the invention is implemented, the component used for this implementation being shown structurally.

FIG. 5 shows an example of a structural embodiment of the component 21 whose functional representation is given in FIG. 4. As can be seen, a number of functions are implemented using operational amplifiers supplied by a positive voltage of 5 V and a negative voltage of −5 V.

The values indicated in FIG. 5 give an example of dimensioning of the component 21 for reducing the common mode current passing through the capacitor 15 for a frequency of 50 Hz in generating an additional voltage at the terminals of this capacitor 15.

The invention is not limited to what has just been described.

In another example, not shown, a single stage amplifier may be used for generating the additional voltage.

In a further variant, the effective voltage delivered by the network 2 to the circuit 4 has another value.

The invention may be applied to assemblies 1 other than those forming part of a vehicle.

The expression "comprising a" should be understood as meaning "comprising at least one" unless specified otherwise.

The invention claimed is:

1. A method of reducing common mode current flowing between an internal ground of an electrical circuit and the Earth ground, said circuit being supplied by an electrical network delivering an alternating voltage, the method comprising:
   applying a voltage by the electrical network between the internal ground of the circuit and the Earth ground; and
   applying an additional voltage between the internal ground of the circuit and the Earth ground using an electronic component interposed between the internal ground of the circuit and the Earth ground, this additional voltage opposing the voltage applied by the electrical network between the internal ground and the Earth ground, so as to reduce the common mode current at the frequency of the electrical network.

2. The method according to claim 1, wherein the additional voltage has a sign opposite to that of the voltage applied by the network between the internal ground of the circuit and the Earth ground.

3. The method according to claim 1, wherein the additional voltage is applied in parallel to the parasitic capacitance existing between the internal ground of the circuit and the Earth ground.

4. The method according to claim 1, wherein the 0 dB bandwidth of the electronic component extends between 5 Hz and 1.1 kHz.

5. The method according to claim 1, wherein the additional voltage in absolute value is less than or equal to the value of said voltage applied by the electrical network.

6. The method according to claim 1, wherein the additional voltage is generated at the output of the electronic component which receives as input the common mode current flowing between the internal ground of the circuit and the Earth ground when the circuit is supplied by the electrical network.

7. The method according to claim 6, wherein the common mode current used as input to the electronic component is obtained from a current delivered by the electrical network to the electrical circuit.

8. The method according to claim 6, wherein the electronic component is configured to slave the value of the common mode current which it receives as input, to a predetermined set value.

9. The method according to claim 1, wherein the additional voltage is applied between the internal ground of the circuit and the Earth ground by applying a first voltage between the internal ground of the circuit and the internal ground of the electronic component and by applying a second voltage of opposite sign to that of the first voltage between the Earth ground and the internal ground of the electronic component, so that the difference between the first and the second voltage is equal to the additional voltage.

10. The method according to claim 1, wherein the electrical network delivers an alternating voltage whose frequency is 50 Hz or 60 Hz.

11. The method according to claim 1, wherein the electronic component is without a field effect transistor.

12. The method according to claim 1, wherein the electrical circuit includes a rectification stage for the alternating voltage delivered by the electrical network, this stage having a positive output terminal and a negative output terminal, and the internal ground of the circuit being connected to one of said output terminals.

13. The method according to claim 12, wherein an energy storage unit is connected between the positive and negative output terminals of the rectification stage, the method being implemented during the recharging of the energy storage unit.

14. The method according to claim 13, the electrical circuit forming part of a hybrid or electrically driven vehicle.

15. An assembly, comprising:
   an electrical circuit, comprising a rectification stage for an alternating voltage, said stage having a positive output terminal and a negative output terminal and the circuit having an internal ground connected to one of said output terminals;
   a frame; and
   a component electrically connected first to the internal ground of the circuit and secondly to the frame, the component being configured for applying a voltage between the internal ground of the circuit and the frame, when the electric circuit is supplied by an electrical network, for reducing the current at the frequency of the network flowing between the internal ground and the frame.

16. The assembly according to claim 15, wherein the electrical circuit does not comprise a transformer.

17. A method of reducing common mode current flowing between an internal ground of an electrical circuit and the Earth ground, said circuit being supplied by an electrical network delivering an alternating voltage, the method comprising:

applying a voltage by the electrical network between the internal ground of the circuit and the Earth ground; and applying an additional voltage between the internal ground of the circuit and the Earth ground using an electronic component interposed between the internal ground of the circuit and the Earth ground, this additional voltage opposing the voltage applied by the electrical network between the internal ground and the Earth ground, so as to reduce the common mode current at the frequency of the electrical network, wherein the electrical circuit does not comprise a transformer.

* * * * *